United States Patent
Liu et al.

(10) Patent No.: US 11,700,108 B2
(45) Date of Patent: Jul. 11, 2023

(54) PHASE DETECTION METHOD AND APPARATUS FOR CLOCK SIGNAL, AND COMMUNICATION DEVICE

(71) Applicant: ZTE Corporation, Shenzhen (CN)

(72) Inventors: Jun Liu, Shenzhen (CN); Zhaobi Wei, Shenzhen (CN); Shan Wang, Shenzhen (CN); Mengbi Lei, Shenzhen (CN); Guojun Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/625,207

(22) PCT Filed: Jul. 6, 2020

(86) PCT No.: PCT/CN2020/100503
§ 371 (c)(1),
(2) Date: Jan. 6, 2022

(87) PCT Pub. No.: WO2021/004439
PCT Pub. Date: Jan. 14, 2021

(65) Prior Publication Data
US 2022/0263644 A1    Aug. 18, 2022

(30) Foreign Application Priority Data
Jul. 8, 2019   (CN) .......................... 201910611885.1

(51) Int. Cl.
*H04L 7/00*     (2006.01)
*H04L 25/00*    (2006.01)
*H04L 25/40*    (2006.01)

(52) U.S. Cl.
CPC .................. *H04L 7/0037* (2013.01)

(58) Field of Classification Search
CPC ....... H04L 7/0037; G01R 25/00; H03L 7/091; H03L 7/0805; H03K 5/14
(Continued)

(56) References Cited
U.S. PATENT DOCUMENTS

| 7,194,365 | B1  |   | 3/2007 | Sonntag |
| 11,233,518 | B2 | * | 1/2022 | Tak .......................... H03L 7/091 |

(Continued)

FOREIGN PATENT DOCUMENTS

| CN | 106470428 A   | 3/2017 |
| WO | 2015096433 A1 | 7/2015 |
| WO | 2018209314 A1 | 11/2018 |

OTHER PUBLICATIONS

European Search Report for corresponding application EP20836462; dated Oct. 6, 2022.
(Continued)

*Primary Examiner* — Phuong Phu
(74) *Attorney, Agent, or Firm* — Cantor Colburn LLP

(57) ABSTRACT

Provided are a phase detection method and apparatus for a clock signal, and a communication device. A clock signal of a clock to be detected is sampled according to sampling periods set by a sampling clock; a phase angle value corresponding to a sampled clock signal in a current sampling period is obtained according to a mapping relationship between sampled signals and phase angle values; a phase difference corresponding to the current sampling period is subtracted from the phase angle value to obtain an initial phase value of the clock to be detected in the current sampling period, wherein the phase difference is a phase difference between the clock to be detected and the sampling clock in the current sampling period; and after the sampling ends, a final phase value of the clock to be detected is obtained according to initial phase values obtained in respective sampling periods.

20 Claims, 10 Drawing Sheets

(58) Field of Classification Search
USPC .......................... 375/371, 226, 373, 354, 375
See application file for complete search history.

(56) References Cited

U.S. PATENT DOCUMENTS

| | | | |
|---|---|---|---|
| 11,381,248 B2* | 7/2022 | Pang | .................. H03L 7/091 |
| 2014/0132245 A1* | 5/2014 | Dally | .................. G01R 25/00 |
| | | | 324/76.82 |
| 2015/0070065 A1 | 3/2015 | Dedic | |
| 2018/0188364 A1* | 7/2018 | Weng | .................. H03L 7/0805 |
| 2019/0033355 A1* | 1/2019 | Dorner | .................. H03K 5/14 |

OTHER PUBLICATIONS

Hongchao Lu, "Application of Non-decreasing Dither and Oversampling Technology in Low Frequency Analong Acquistion System", Research and Exploraton in Laboratory, vol. 38 No. 2 Feb. 2019.

Qualcomm Incorporated, "Phase and frequency tracking reference signal considerations", 3GPP TSG-RAN WG1 NR #89AH, Jun. 27-30, 2017 Qingdao, P.R. China, R1-1711173.

Wang Ning, "Design and Realization of Phase Synchronization Module for Multi-channel Radio Frequency Signal", www.txjszz.com, vol. 51 No. 6, Jun. 2018.

International Search Report for corresponding application PCT/CN2020/100503 filed Jul. 6, 2020; dated Oct. 10, 2020.

\* cited by examiner

PHASE DETECTION METHOD AND APPARATUS FOR CLOCK SIGNAL, AND COMMUNICATION DEVICE

CROSS REFERENCE

This application is a National Stage Filing of the PCT International Application No. PCT/CN2020/100503 filed on Jul. 6, 2020, which claims priority to Chinese Application No. 201910611885.1 filed on Jul. 8, 2019, the entirety of which is herein incorporated by reference.

TECHNICAL FIELD

The present disclosure relates to the technical field of communications, in particular to a phase detection method and apparatus for a clock signal, and a communication device.

BACKGROUND

A Massive Multiple In Multiple Out (MIMO) technology in a multi-array antenna base station is a key technology in 4.5G and 5G communications. In 5G communications, Space Division Multiple Access (SDMA) is an important example of application of the Massive MIMO technology. The SDMA uses a beamforming technology to concentrate signal energy in a specific direction for transmission, thus increasing spectrum utilization efficiency and reducing interference to other receivers. Beamforming has a strict requirement for the phase difference of signals between multiple channels of transceivers. For example, the phase difference between multiple channels of the transceivers in a 5G base station of sub 6G is required to be less than 5°. Therefore, a wireless base station system will adopt a series of phase detection and adjustment measures to reduce a phase error between channels, so as to align the phases of signals of multiple channels.

In a phase synchronization mechanism, phase detection of a radio frequency clock signal is the first step, and the phase detection accuracy of the radio frequency clock signal directly affects the effect of multi-channel synchronization. At present, there is no good scheme to accurately detect the phase of a radio frequency clock signal, so it is very difficult to ensure a phase synchronization effect.

SUMMARY

Embodiments of the present disclosure provide a phase detection method and apparatus for a clock signal, and a communication device, which can solve the problem of how to accurately detect the phase of a radio frequency clock signal, so as to ensure a phase synchronization effect.

The embodiments of the present disclosure provide a phase detection method for a clock signal, which includes the following operations.

A clock signal of a clock to be detected is sampled according to sampling periods set by a sampling clock.

A phase angle value corresponding to a sampled clock signal in a current sampling period is obtained according to a mapping relationship between sampled signals and phase angle values.

A phase difference corresponding to the current sampling period is subtracted from the phase angle value to obtain an initial phase value of the clock to be detected in the current sampling period, wherein the phase difference is a phase difference between the clock to be detected and the sampling clock in the current sampling period.

After the sampling ends, a final phase value of the clock to be detected is obtained according to initial phase values obtained in respective sampling periods.

The embodiments of the present disclosure provide a phase detection apparatus for a clock signal, which includes: a sampling module, a phase rough calculation module, and a phase statistics module.

The sampling module is configured to sample, according to sampling periods set by a sampling clock, a clock signal of a clock to be detected.

The phase rough calculation module is configured to obtain, according to a mapping relationship between sampled signals and phase angle values, a phase angle value corresponding to a sampled clock signal in a current sampling period, and subtract a phase difference corresponding to the current sampling period from the phase angle value to obtain an initial phase value of the clock to be detected in the current sampling period, wherein the phase difference is a phase difference between the clock to be detected and the sampling clock in the current sampling period.

The phase statistics module is configured to obtain, after the sampling ends, a final phase value of the clock to be detected according to initial phase values obtained in respective sampling periods.

The embodiments of the present disclosure provide a communication device, which includes at least one phase detection apparatus for a clock signal as described above.

Beneficial Effects

According to the phase detection method and apparatus for a clock signal, and the communication device provided in the embodiments of the present disclosure, a clock signal of a clock to be detected is sampled according to sampling periods set by a sampling clock; a phase angle value corresponding to a sampled clock signal in a current sampling period is obtained according to a mapping relationship between sampled signals and phase angle values; a phase difference corresponding to the current sampling period is subtracted from the phase angle value to obtain an initial phase value of the clock to be detected in the current sampling period, wherein the phase difference is a phase difference between the clock to be detected and the sampling clock in the current sampling period; and after the sampling ends, a final phase value of the clock to be detected is obtained according to initial phase values obtained in respective sampling periods. Since the final phase value is obtained according to the initial phase values obtained in multiple sampling periods, the obtained final phase value has higher accuracy and better fault tolerance. Thus, the reliability of the phase detection method for a clock signal provided by the embodiments of the present disclosure can be improved, and the phase synchronization effect can be ensured when multi-channel phase synchronization is required.

Other features and corresponding beneficial effects of the present disclosure are elaborated in the latter part of the specification, and it should be understood that at least some of the beneficial effects become apparent from the records in the specification.

DETAILED DESCRIPTION

For making the purpose, technical solutions and the advantages of the embodiments of the present disclosure more clear, the embodiments of the present disclosure are further elaborated below by means of exemplary implementations in combination with the accompanying drawings. It is to be understood that the exemplary embodiments described here are only used for explaining the present disclosure, but not for limiting the present disclosure.

Embodiment 1

Figure 1:
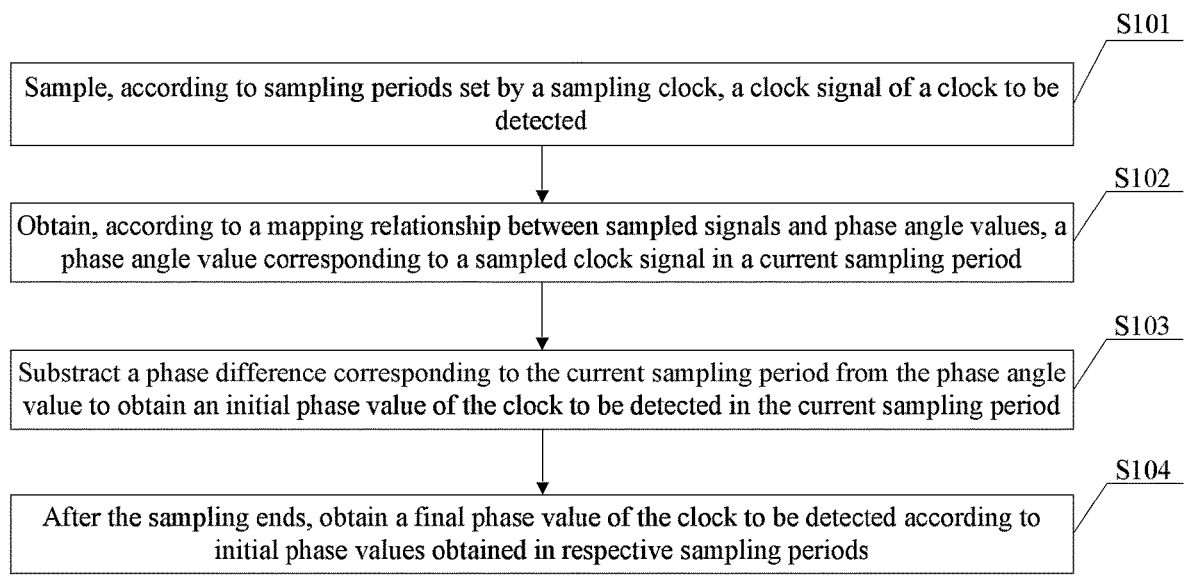
FIG. 1 is a flowchart of a phase detection method for a clock signal according to Embodiment 1 of the present disclosure.

In order to implement the accurate phase detection of a clock signal, the present embodiment provides a phase detection method for a clock signal. As shown in FIG. 1, the phase detection method for a clock signal includes the following operations S101 to S104.

At S101, a clock signal of a clock to be detected is sampled according to sampling periods set by a sampling clock.

The clock to be detected in the present embodiment may be, but is not limited to, various radio frequency clocks. For a multi-channel application scenario where multiple channels use at least two radio frequency clocks, the phase detection method provided in the present embodiment can be used for the clock signal generated by each radio frequency clock.

The sampling clock in the present embodiment may be selected flexibly according to the characteristics of the current clock to be detected. For example, the sampling clock may be set flexibly according to the frequency of the clock to be detected and the current detection accuracy requirement.

In the present embodiment, when the clock to be detected is detected, the number of sampling periods may also be flexibly set according to a specific application scenario. In some examples, the number of sampling periods may also be set based on the least common multiple between the frequency of the sampling clock and the frequency of the clock to be detected. For example, the number of the sampling periods may be set to 1000, 2000, 3000, 6000, etc.

In the present embodiment, the clock signal of the clock to be detected may be, but is not limited to, any of the following signal types: single-ended signal, differential signal, or orthogonal signal.

At S102, a phase angle value corresponding to a sampled clock signal in a current sampling period is obtained according to a mapping relationship between sampled signals and phase angle values.

In the present embodiment, the mapping relationship between the sampled signals and the phase angle values may be preset. In some application scenarios of the present embodiment, since the sampled clock signal is an analog signal, analog amplitude information $clk_{sig}$ may be converted into a discrete digital pulse signal sequence bin. In the present embodiment, conversion here may be conversion of the digital pulse signal sequence according to positive and negative values of the amplitude information, and does not involve extraction of the amplitude information of the clock to be detected, so high reliability can still be achieved even when the clock signal to be detected has a high frequency.

Therefore, the preset mapping relationship between the sampled signals and the phase angle values in the present embodiment may include: the mapping relationship between digital pulse signal sequences and the phase angle values.

Figure 2:
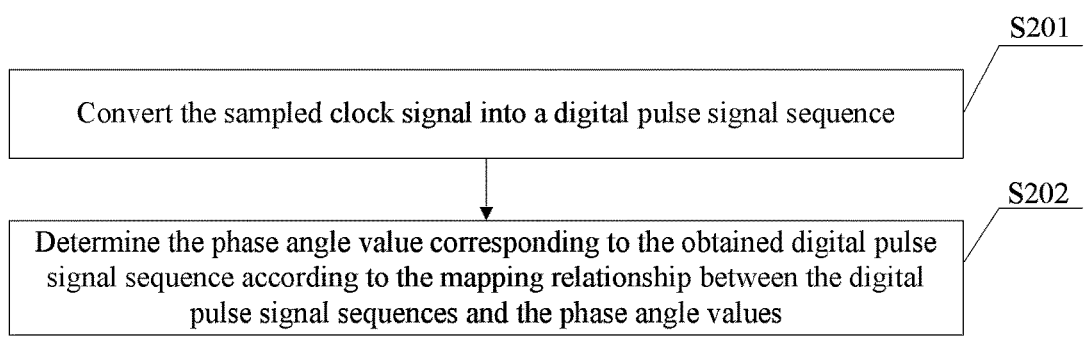
FIG. 2 is a flowchart of obtaining a phase angle value according to Embodiment 1 of the present disclosure.

In this case, as shown in FIG. 2, the operation that a phase angle value corresponding to a sampled clock signal in a current sampling period is obtained may include the following operations S201 and S202.

At S201, the sampled clock signal is converted into a digital pulse signal sequence.

At S202, the phase angle value corresponding to the obtained digital pulse signal sequence is determined according to the mapping relationship between the digital pulse signal sequences and the phase angle values.

Figure 3:
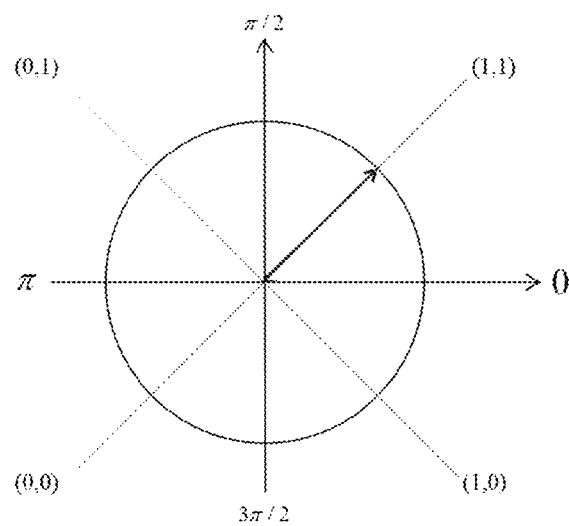
FIG. 3 is a schematic diagram of a mapping relationship between digital pulse signal sequences and phase angle values according to Embodiment 1 of the present disclosure.

In some application scenarios of the present embodiment, according to a phase interval of the clock signal to be detected at the rising edge of each sampling clock, an intermediate value of each interval may be taken as a mapping value of the interval. For example, see the mapping relationship between the digital pulse signal sequences and the phase angle values illustrated in FIG. 3, if the clock signal of the clock to be detected is a differential signal or an orthogonal signal, after the sampled clock signal is converted into a digital pulse signal sequence, when the output digital pulse signal sequence is 11, the corresponding phase angle value is $\pi/4$; when the output digital pulse signal sequence is 01, the corresponding phase angle value is $3\pi/4$; when the output digital pulse signal sequence is 00, the corresponding phase angle value is $5\pi/4$; and when the output digital pulse signal sequence is 00, the corresponding phase angle value is $7\pi/4$. If the clock signal of the clock to be detected is a single-ended signal, when the output digital pulse signal sequence is 1, the corresponding phase angle value is $\pi/2$; and when the output digital pulse signal sequence is 0, the corresponding phase angle value is $3\pi/2$.

It should be understood that the setting of the mapping relationship between the digital pulse signal sequences and the phase angle values is not limited to the manners in the above example, and the mapping may be flexibly set according to requirements.

At S103, a phase difference corresponding to the current sampling period is subtracted from the phase angle value to obtain an initial phase value of the clock to be detected in the current sampling period.

In the present embodiment, the phase difference corresponding to the current sampling period is the phase difference $\varphi_T$ between the clock to be detected and the sampling clock in the current sampling period.

In the present embodiment, the way of calculating the phase difference between the clock to be detected and the sampling clock may be, but is not limited to, that:

according to the relationship between a frequency value $val_{ref}$ of the sampling clock and a frequency value $val_{sig}$ of the clock to be detected, the phase difference $\varphi_T$ between the clock to be detected and the sampling clock corresponding to a sampling period is calculated:

$$\varphi_T = 2\pi \times \text{mod}(val_{sig}/val_{ref}).$$

In the present embodiment, the phase difference between the clock to be detected and the sampling clock in the current sampling period is: a value obtained by multiplying the phase difference between the clock to be detected and the sampling clock by a current number of sampling periods to obtain a product, and then taking a remainder of the product divided by $2\pi$. For example, assuming that the current number of sampling periods is k, the phase difference between the clock to be detected and the sampling clock in the current sampling period is: $\text{mod}(k \times \varphi_T/2\pi)$.

Through the above process, the initial phase value of the clock to be detected in the current sampling period can be obtained. After k sampling periods, the initial phase values of k sampling periods can be obtained.

As an exemplary implementation, in some application scenarios, after the phase difference corresponding to the current sampling period is subtracted from the phase angle value to obtain the initial phase of the clock to be detected in the current sampling period, and before the final phase value of the clock to be detected is obtained according to the initial phase values obtained in respective sampling periods, the following first standardization process is also included:

in a case where the initial phase value obtained in the current sampling period is greater than an initial phase value obtained in a first sampling period plus $\pi$, $2\pi$ is subtracted from the initial phase value obtained in the current sampling period;

in a case where the initial phase value obtained in the current sampling period is less than the initial phase value obtained in the first sampling period minus $\pi$, $2\pi$ is added to the initial phase value obtained in the current sampling period; and in a case where the initial phase value obtained in the current sampling period does not meet the above two cases, the above standardization is not performed.

That is, as an exemplary implementation of the present embodiment, the initial phase value calculated in the subsequent sampling period may also be standardized based on the initial phase value obtained in the first sampling period (of course, other sampling period may also be used as required), so as to facilitate the accurate determination of the subsequent final phase value.

At S104, after the sampling ends, a final phase value of the clock to be detected is obtained according to initial phase values obtained in respective sampling periods.

For example, assuming that the number of sampling periods is set as n, n initial phase values, which are respectively represented by $\theta_1, \theta_2, \ldots, \theta_n$, can be obtained after sampling detection of n sampling periods is completed.

In the present embodiment, in a case where the clock signal of the current clock to be detected is a single-ended signal, the operation that the final phase value of the clock to be detected is obtained according to initial phase values obtained in respective sampling periods in S104 may include that:

a minimum initial phase value is selected from the initial phase values obtained in the respective sampling periods as the final phase value $\theta_0$ of the clock to be detected, that is, $\theta_0 = \min(\theta_1, \theta_2, \ldots, \theta_n)$.

In the present embodiment, in a case where the clock signal of the current clock to be detected is a differential signal or an orthogonal signal, the operation that the final phase value of the clock to be detected is obtained according to initial phase values obtained in respective sampling periods in S104 may include that:

an average value of the initial phase values obtained in the respective sampling periods is determined as the final phase value of the clock to be detected, that is, $\theta_0 = (\theta_1 + \theta_2 + \ldots + \theta_n)/n$.

The phase detection method for a clock signal provided in the present embodiment allows multiple sampling errors in a sampling process. According to an exemplary implementation, the initial phase value calculated in the first sampling period may be used as the reference, and the error in the first sampling period will affect the initial phase values and the final phase value. Therefore, as an exemplary implementation, in some application scenarios, the following second standardization process may also be performed on the obtained final phase value after the final phase value of the clock to be detected is obtained.

In a case where the obtained final phase value is less than 0 (that is, the obtained final phase value is negative), $2\pi$ is added to the final phase value. In a case where the obtained final phase value is greater than 0 (that is, the obtained final phase value is positive), the second standardization is not performed.

Figure 4:
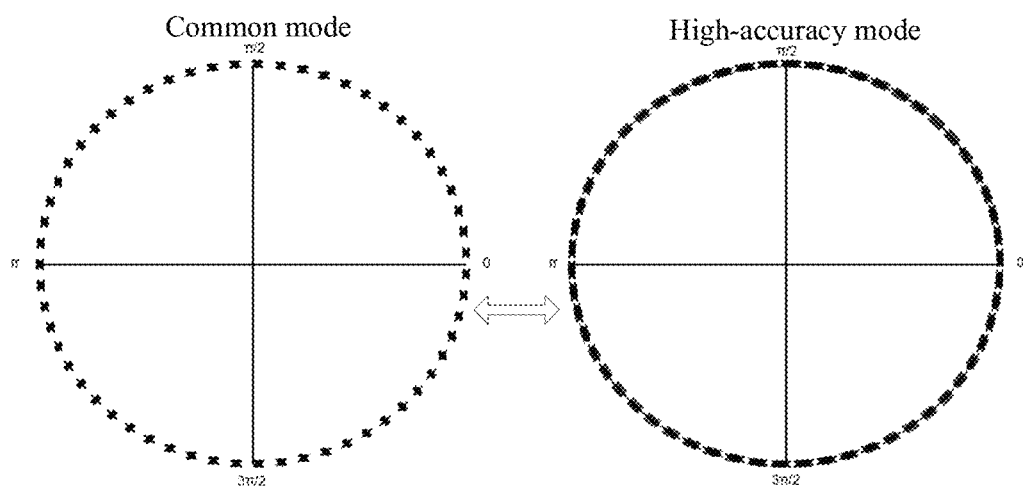
FIG. 4 is a schematic diagram of sampling point coverage in a common mode and a high-accuracy mode according to Embodiment 1 of the present disclosure.
Figure 5:
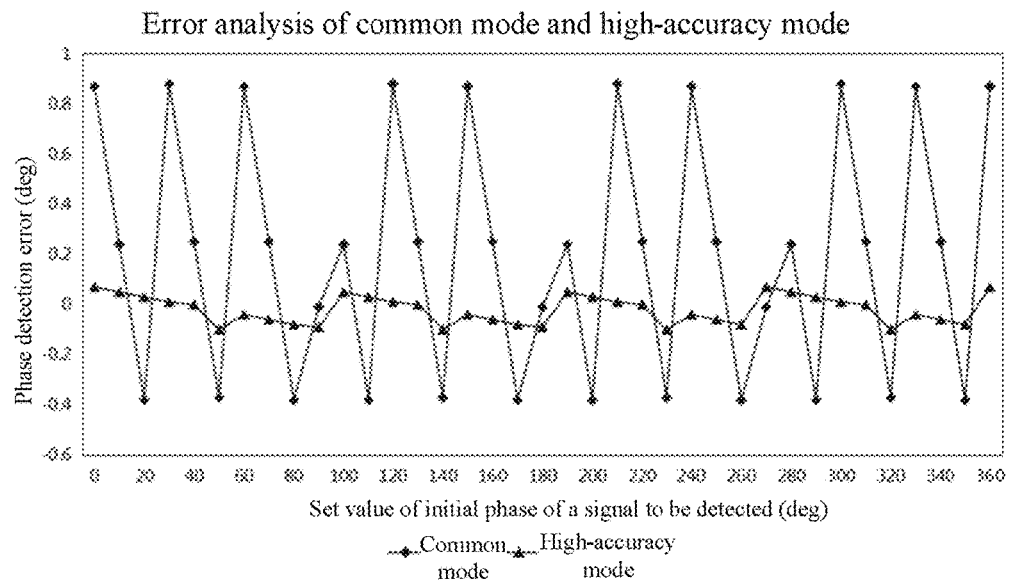
FIG. 5 is a schematic diagram of error analysis in a common mode and a high-accuracy mode according to Embodiment 1 of the present disclosure.

As an exemplary implementation, in some application scenarios of the present embodiment, after the final phase value is obtained, when it is determined according to the final phase value that a detected phase error (namely the detection accuracy) is greater than a preset error threshold (that is, it is determined that the detection accuracy does not meet the current requirement), a sampling clock with a frequency greater than a frequency of the current sampling clock may be used for sampling, so as to increase a minimum common multiple of the frequency of the sampling clock and a frequency of the clock to be detected, weaken the correlation between the clock to be detected and the frequency of the sampling clock, and prevent sampling from entering a cycle. As shown in FIG. 4 and FIG. 5, by selecting a sampling clock with a frequency having a weak correlation with the frequency of the clock to be detected, sampling points can cover the whole phase interval [0, 2π), and the diversity of samples can be increased, thereby improving remarkably the phase detection accuracy of the whole phase detection scheme.

It can be seen that the phase detection method provided in the present embodiment can detect the phase of the clock signal of each clock to be detected with high accuracy. When the phase detection method is applied in a multi-channel scenario, the phase value of each channel can be detected with high accuracy, so that accurate phase differences between respective channels can be obtained, which provides an accurate basis for the subsequent synchronous control.

In the related technologies, there is also a circuit for identifying signal frequencies of two input clocks and the phase difference between two input clocks through a Phase and Frequency Detector (PFD). In the related technologies, the PFD is composed of two D triggers and an NAND gate, and the D trigger outputs a high level after receiving the rising edge of the input clock, and resets after the outputs of both D triggers reach a high level. Therefore, the PFD can output a pulse signal that represents the frequency or phase difference between two input clock signals. However, the application of the PFD to the phase detection of transceiver channels or other scenes has the following difficulties and problems.

First, PFD phase detection will greatly increase the complexity of the original system. In the MIMO system where phase detection is required, the number of transceiver channels has reached dozens or even hundreds, and an equal number of PFDs will be required to identify the characteristics of two channel signals based on the PFD. In addition, the MIMO system is generally composed of multiple chips, so connecting wires between the chips and the existing PFD will make PCB layout very complicated and reduce circuit reliability.

Second, the PFD cannot directly give or it is difficult for the PFD to give phase information of the input clock signal. The PFD represents the frequency or phase difference between two input clock signals as a pulse signal with a certain width, rather than a series of high and low levels or binary sequences, so it is difficult for a post-stage digital circuit to convert such pulse signal into pure phase information. In a scenario where a phase value needs to be directly detected, the PFD cannot meet application requirements.

Finally, in a wireless communication scenario, the frequency and phase detection ability of the PFD is greatly challenged. With the increasing shortage of spectrum resources and the dramatic increase in the amount of data transmitted, the communication technology is constantly evolving, and the frequency band of wireless communication is developing towards high frequency and large bandwidth. For the Sub 6G low frequency band in 5G NR, the frequency and phase detection ability of the PFD is already too limited, let alone the 5G high frequency band as high as 24.25-29.5 GHz. Moreover, such high-frequency clock signals are no longer simple square waves or quasi-square waves, and after receiving these signals, the PFD is no longer able to properly or reliably show its frequency and phase detection ability.

In addition, there are also schemes for solving the phase detection problem in wireless communication scenarios in the related technologies. Numerically Controlled Oscillators (NCO) and digital circuit modules that implement an arctangent function are used in these schemes. The accuracy of these digital circuit modules is limited. If the number of iterations is small, the phase detection accuracy will be greatly limited. If the number of iterations is large, the cost of computing resources will be significantly increased. In addition, these schemes include complex matrix multiplication and complex conjugate operation with complex algorithms, which is not conducive to reducing circuit scale and power consumption of an application system. Moreover, these schemes require two input signals to be detected to be orthogonal, so only phase detection of orthogonal signals can be implemented.

In the phase detection method for a clock signal provided by the present embodiment, a series of discrete binary sequences are obtained by sampling a clock signal to be detected, based on these pieces of discrete digital sampling information and a frequency relationship between the clock to be detected and a sampling clock, a phase interval of a clock to be detected is determined in each sampling period to obtain an initial phase value with low accuracy, then, phase value detection with very high accuracy is implemented through lots of sampling and statistical averaging or taking the minimum. In order to ensure the diversity of sampling, a frequency value of the sampling clock may be flexibly selected to make the frequency value of the clock to be detected and the frequency value of the sampling clock have a large least common multiple, so as to flexibly adjust the accuracy required for detection according to requirements.

The phase detection method provided in the present embodiment can implement the phase detection of the single-ended, differential or orthogonal clock signals according to the requirements of application scenarios, has good universality and compatibility, and can be applied to various application scenarios.

The scheme provided in the present embodiment can obtain the final phase value by statistical convergence of large amounts of data, in which multiple process data errors are allowed, so the fault tolerance is high, and high reliability of the scheme is guaranteed.

The design difficulty of a loose sampling circuit required by the scheme provided in the present embodiment is low, and the working frequency of a post-stage digital circuit can be reduced, so the ease of realization of the circuit can be improved.

The schemes provided in the present embodiment only involve rough sampling of the clock to be detected, but do not extract the amplitude information of the clock to be detected, so even for the signal to be detected with a high frequency, high reliability can still be achieved.

Finally, in the schemes provided in the present embodiment, except for the sampling circuit, all the other circuits are digital circuits, and the sampling circuit may also be implemented in a digital form, for example, the sampling circuit may be implemented by a True Single Phase Clock (TSPC) trigger or a Current Mode Logic (CML) trigger. Therefore, the whole circuit scheme is not sensitive to Process Voltage Temperature (PVT) changes, and then high robustness can be achieved.

Embodiment 2

Figure 6:
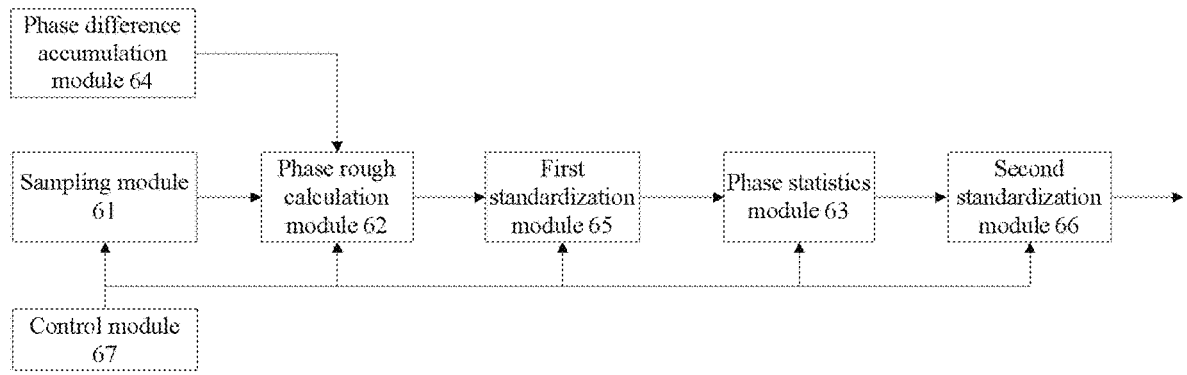
FIG. 6 is a structural schematic diagram of a phase detection apparatus for a clock signal according to Embodiment 2 of the present disclosure.

The present embodiment provides a phase detection apparatus for a clock signal, which can implement, but is not limited to implement, the phase detection method for a clock signal described in the above embodiment. The phase detection apparatus may be set in various communication devices with a clock. As shown in FIG. 6, the phase detection apparatus includes a sampling module 61, a phase rough calculation module 62 and a phase statistics module 63.

A sampling module 61 is configured to sample, according to sampling periods set by a sampling clock, a clock signal of a clock to be detected.

The clock to be detected in the present embodiment may be, but is not limited to, various radio frequency clocks. For a multi-channel application scenario where multiple channels use at least two radio frequency clocks, the phase detection apparatus provided in the present embodiment may be configured to perform phase detection to the clock signal generated by each radio frequency clock. One phase detection apparatus may be used for one radio frequency clock, or multiple radio frequency clocks may share one phase detection apparatus. The sampling clock in the present embodiment may be selected flexibly according to the characteristics of the current clock to be detected. For example, the sampling clock may be set flexibly according to the frequency of the clock to be detected and the current detection accuracy requirement.

In some application scenarios of the present embodiment, the sampling module 61 may include a core sampler and a post-stage waveform shaper for the purpose of converting input analog amplitude information into discrete digital pulse signals. The core sampler may be implemented by flip-flops in the form of TSPC or CML. The post-stage waveform shaper may be implemented by a Schmidt trigger or an inverter circuit, and is configured to amplify the signal swing and shape the waveform. The sampler may be differential, single-ended or orthogonal according to the type of the clock signal to be detected. According to the requirement for the phase detection accuracy, a sampling clock with a certain frequency may be selected to reduce the frequency correlation between the clock to be detected and the sampling clock, that is, to increase the least common multiple of the frequency of the clock to be detected and the frequency of the sampling clock.

Figure 7:
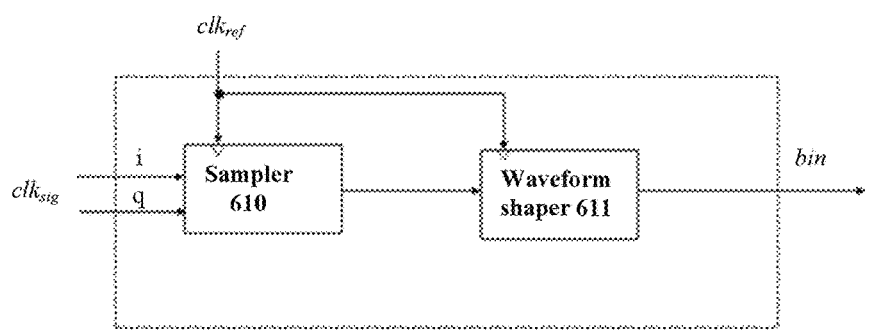
FIG. 7 is a structural schematic diagram of a sampling module according to Embodiment 2 of the present disclosure.
Figure 8:
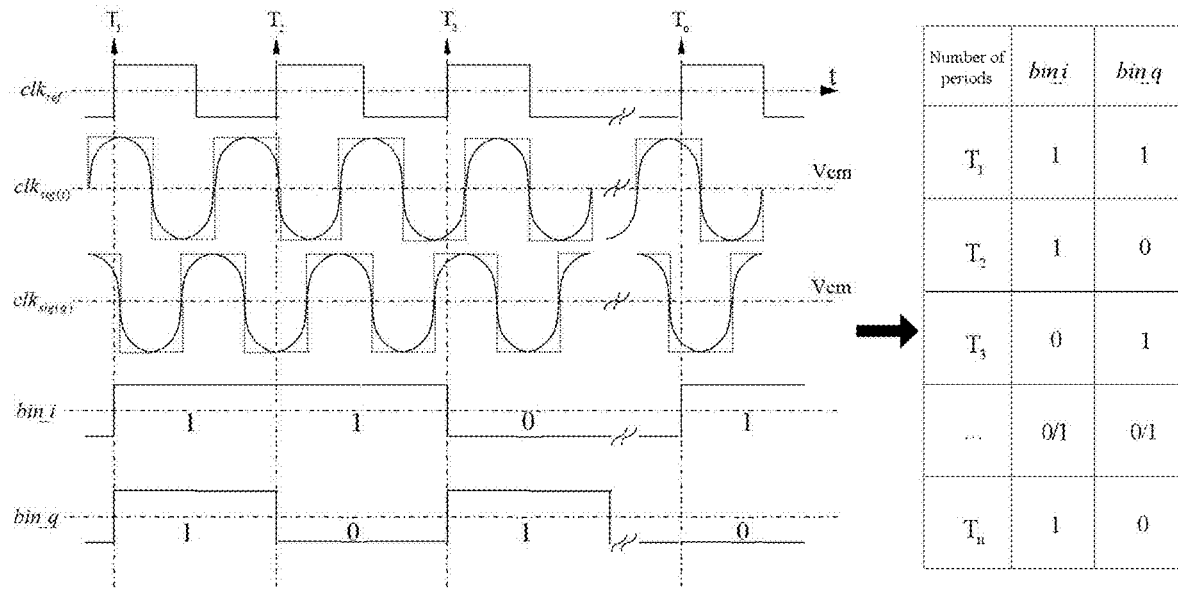
FIG. 8 is a schematic diagram of signal sampling according to Embodiment 2 of the present disclosure.

For example, see FIG. 7 for the structure of the sampling module 61 as an example, the sampling module 61 may include a sampler 610 composed of the flip-flops in the form of TSPC or CML, and may also include a waveform shaper 611. The waveform shaper 611 amplifies the amplitude and shapes the waveform of a signal output by the sampler 610, and outputs an ideal digital pulse signal bin. For example, in the scenario where the clock to be detected is in the orthogonal form as shown in FIG. 8, the sampler 610 samples the clock to be detected at the clock rising edge of each sampling clock $clk_{ref}$, outputs 0 if a sampling level is higher than or equal to a common mode level, and outputs 1 if the sampling level is lower than the common mode level. The corresponding digital pulse signal bin output in each sampling period is shown in the table on the right of FIG. 8.

The phase rough calculation module 62 is configured to obtain, according to a mapping relationship between sampled signals and phase angle values, a phase angle value corresponding to a sampled clock signal in a current sampling period, and subtract a phase difference corresponding to the current sampling period from the phase angle value to obtain the initial phase value of the clock to be detected in the current sampling period, wherein the phase difference is a phase difference between the clock to be detected and the sampling clock in the current sampling period. The mapping relationship between the sampled signals and the phase angle values may be preset through a corresponding register. The preset mapping relationship between the sampled signals and the phase angle values in the present embodiment may include: a mapping relationship between digital pulse signal sequences and the phase angle values.

Figure 9:
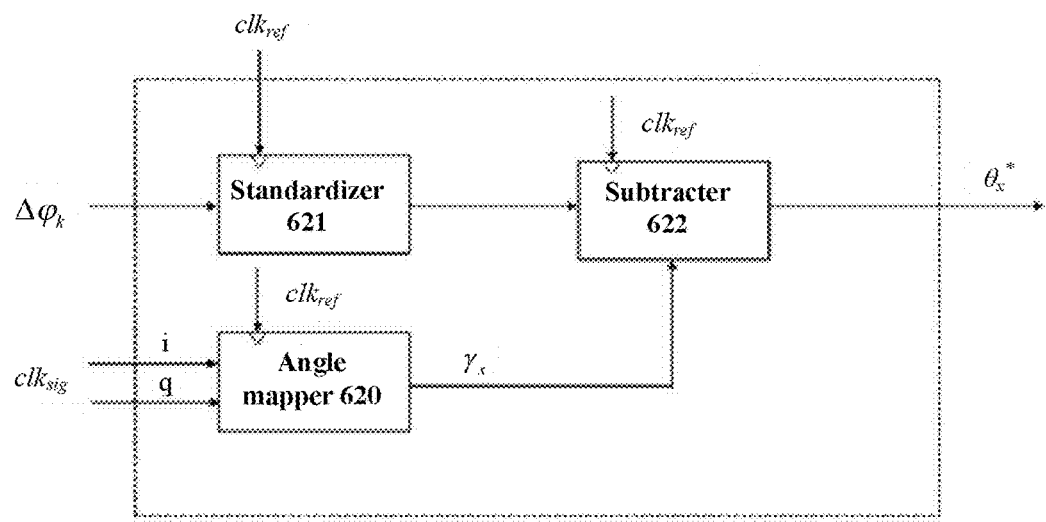
FIG. 9 is a structural schematic diagram of a phase rough calculation module according to Embodiment 2 of the present disclosure.

As an exemplary implementation, in some application scenarios of the present embodiment, as shown in FIG. 9, the phase rough calculation module 62 may include: an angle mapper 620, a standardizer 621, and a subtracter 622. The angle mapper 620 is configured to obtain the phase angle value corresponding to the current sampled signal according to the input digital pulse signal bin and the mapping relationship between the digital pulse signal sequences and the phase angle values which is written from the register reg. The subtracter 622 is configured to subtract a phase difference corresponding to the current sampling period from the phase angle value obtained by the angle mapper 620 to obtain the initial phase value of the clock to be detected in the current sampling period.

Figure 10:
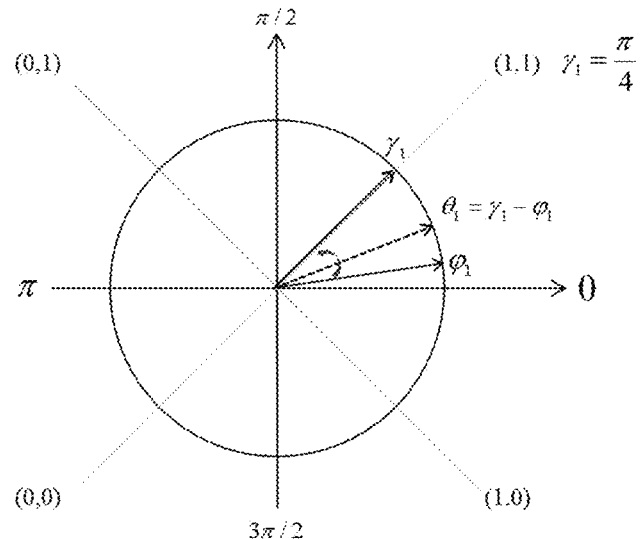
FIG. 10 is a schematic diagram of an initial phase in a first sampling period according to Embodiment 2 of the present disclosure.
Figure 11:
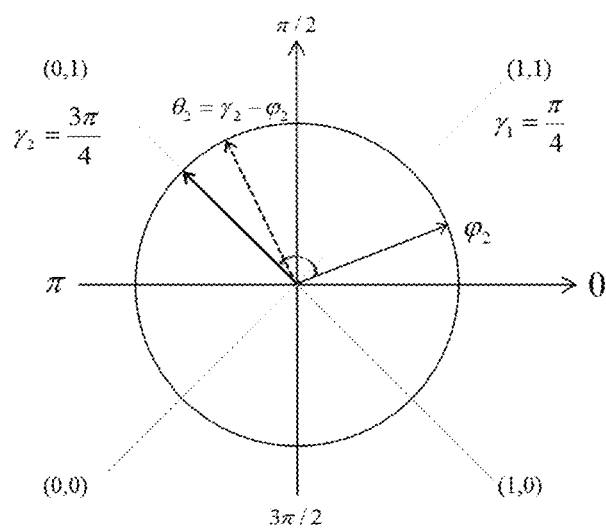
FIG. 11 is a schematic diagram of an initial phase in a second sampling period according to Embodiment 2 of the present disclosure.

As shown in FIG. 6, the phase detection apparatus may also include a phase difference accumulation module 64, which is configured to send an accumulated phase difference $\Delta\varphi_k^*$ obtained by multiplying the phase difference between the clock to be detected and the sampling clock by a current number of sampling periods (or by superposing the phase differences in respective periods one by one) to the phase rough calculation module 62. The standardizer 621 of the phase rough calculation module 62 is configured to divide the obtained accumulated phase difference $\Delta\varphi_k^*$ by $2\pi$ and take a remainder of the accumulated phase difference divided by $2\pi$ as the phase difference corresponding to the current sampling period, that is, $\Delta\varphi_k=\mathrm{mod}(\Delta\varphi_k^*/2\pi)$ so as to normalize the value $\Delta\varphi_k$ in a range between 0 and $2\pi$. The subtracter 622 is configured to subtract the normalized value $\Delta\varphi_k$ from the phase angle value to obtain and output the initial phase value $\theta_x^*$. For example, as shown in FIG. 10 and FIG. 11, the initial phase value output by the phase rough calculation module 62 in the first sampling period T1 is $\theta_1$ in FIG. 10, the initial phase value output by the phase rough calculation module 62 in the second sampling period T2 is $\theta_2$ in FIG. 11, by that analogy for the subsequent periods.

Figure 12:
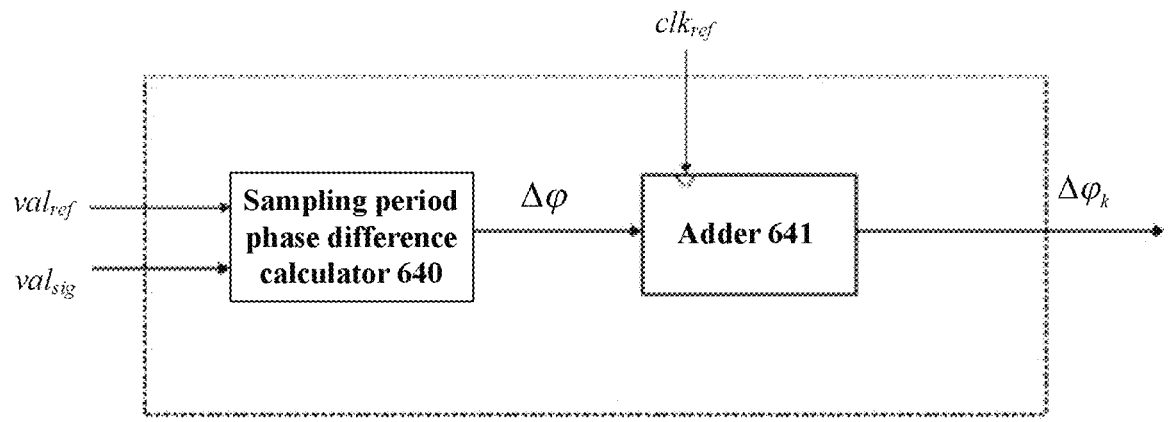
FIG. 12 is a structural schematic diagram of a phase difference accumulation module according to Embodiment 2 of the present disclosure.

As an exemplary implementation, in some application scenarios, the phase difference accumulation module 64 may be implemented based on an adder or multiplier, and is configured to calculate the accumulated phase difference between the sampling clock and the clock to be detected since the sampling operation is triggered according to the frequency relationship between the clock signal to be detected and the sampling clock signal and the number of passed sampling periods. For example, as shown in FIG. 12, the phase difference accumulation module 64 may include a sampling period phase difference calculator 640 and an adder 641. The sampling period phase difference calculator 640 is configured to calculate the phase difference between the sampling clock and the clock to be detected in a single sampling period. For example, the sampling period phase difference calculator 640 calculates the phase difference $\varphi_T$, where $\varphi_T=2\pi\times\mathrm{mod}(\mathrm{val}_{sig}/\mathrm{val}_{ref})$, between the clock to be detected and the sampling clock in a single sampling period according to the relationship between the frequency value $\mathrm{val}_{ref}$ of the sampling clock and the frequency value $\mathrm{val}_{sig}$ of the clock to be detected. The adder 641 is configured to accumulate the obtained phase differences to obtain the accumulated phase difference $\Delta\varphi_k^*=K\times\varphi_T$ corresponding to the current number of sampling periods.

As an exemplary implementation, in some application scenarios, the phase detection apparatus may also include: a first standardization module 65, configured to subtract $2\pi$ from the initial phase value obtained in the current sampling period and send the difference to the phase statistics module 63 when the initial phase value of the clock to be detected in the current sampling period obtained by the phase rough calculation module 62 is greater than the initial phase value obtained in the first sampling period plus $\pi$, and add $2\pi$ to the initial phase value obtained in the current sampling period and send the sum to the phase statistics module 63 when the initial phase value of the clock to be detected in the current sampling period obtained by the phase rough calculation module 62 is less than the initial phase value obtained in the first sampling period minus $\pi$.

Figure 13:
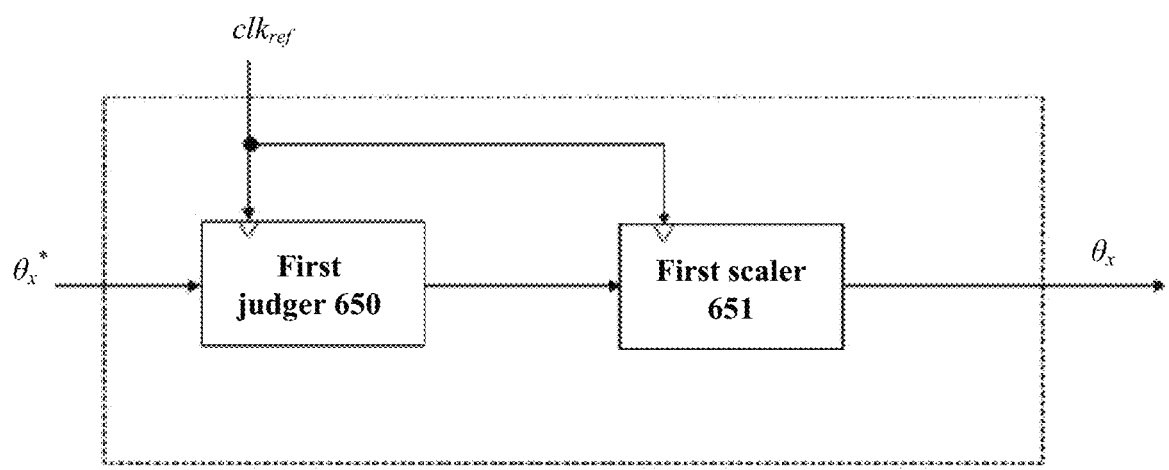
FIG. 13 is a structural schematic diagram of a first standardization module according to Embodiment 2 of the present disclosure.
Figure 14:
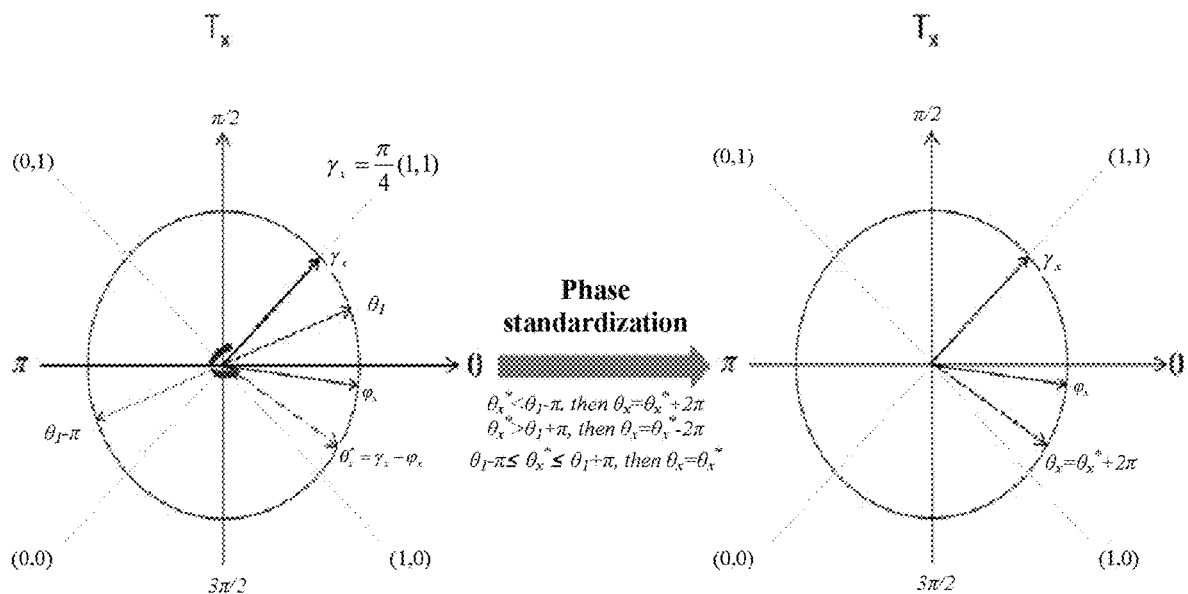
FIG. 14 is a schematic diagram of phase standardization according to Embodiment 2 of the present disclosure.

For example, as shown in FIG. 13, a first standardization module 65 may include a first judger 650 and a first scaler 651. As shown in FIG. 14, the first judger 650 takes the initial phase angle value $\theta_1^*$ obtained in the first sampling period as a reference to determine each subsequent value $\theta_x^*$. In a case where the subsequent calculated initial phase value $\theta_x^*$ is greater than the first initial phase value $\theta_1^*$ plus $\pi$, $2\pi$ is subtracted from $\theta_x^*$ by the first scaler 651, and $\theta_x=\theta_x^*-2\pi$ is output. In a case where the subsequent calculated initial phase value $\theta_x^*$ is less than the first initial phase value $\theta_1^*$ minus $\pi$, $2\pi$ is added to $\theta_x^*$ by the first scaler 651, and $\theta_x=\theta_x^*+2\pi$ is output. In other cases, no standardization is performed, and $\theta_x=\theta_x^*$.

The phase statistics module 63 is configured to obtain, after the sampling ends, the final phase value of the clock to be detected according to initial phase values obtained in respective sampling periods. In a case where the clock signal to be detected is a differential or orthogonal input signal, the phase statistics module 63 may be a statistical average module, which takes the average of the initial phase values obtained in respective sampling periods as the final phase value of the clock to be detected, that is, $\theta_0=(\theta_1+\theta_2+\ldots+\theta_n)/n$. In a case where the clock signal to be detected is a single-ended signal, the phase statistics module 63 selects a minimum initial phase value $\theta_0$ as the final phase value of the clock to be detected, that is, $\theta_0=\min(\theta_1, \theta_2, \ldots, \theta_n)$.

Figure 15:
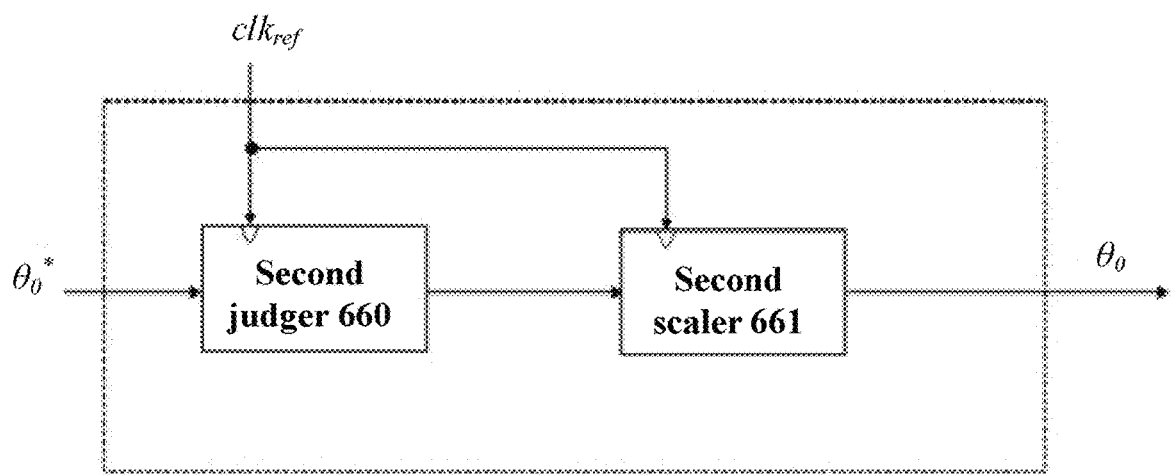
FIG. 15 is a structural schematic diagram of a second standardization module according to Embodiment 2 of the present disclosure.

A second standardization module 66 is configured to add $2\pi$ to the final phase value in a case where the final phase value obtained by the phase statistics module 63 is less than 0. As shown in FIG. 15, the second standardization module 66 may include a second judger 660 and a second scaler 661. In a case where the second judger 660 judges that the final phase value $\theta_0^*$ is negative, the second scaler 661 adds $2\pi$ to the value $\theta_0^*$, and $\theta_0=\theta_0^*+2\pi$ is output. In a case where the second judger 660 judges that the final phase value $\theta_0^*$ is positive, the second scaler 661 performs no processing, and $\theta_0=\theta_0^*$ is output.

As shown in FIG. 6, the phase detection apparatus may also include: a control module 67, which may be configured to update, in a case of determining according to the final phase value that a detected phase error is greater than a preset error threshold, to use a sampling clock with a frequency greater than a frequency of the current sampling clock for sampling, so as to increase a minimum common multiple of the frequency of the sampling clock and a frequency of the clock to be detected. The control module 67 may also be configured to configure the number $\mathrm{val}_{sam}$ of sampling periods, and implement control functions, such as enabling and resetting, over other modules in FIG. 6.

It can be seen that the phase of the clock signal of the radio frequency clock can be detected with high accuracy through the phase detection apparatus for a clock signal provided in the present embodiment, so that the radio frequency clock can meet the phase synchronization requirement more accurately when being applied in the multi-channel scenario requiring phase synchronization, thereby improving the communication performance.

Embodiment 3

For ease of understanding the present embodiment is illustrated below through several exemplary application scenarios.

First Application Scenario

Figure 16:
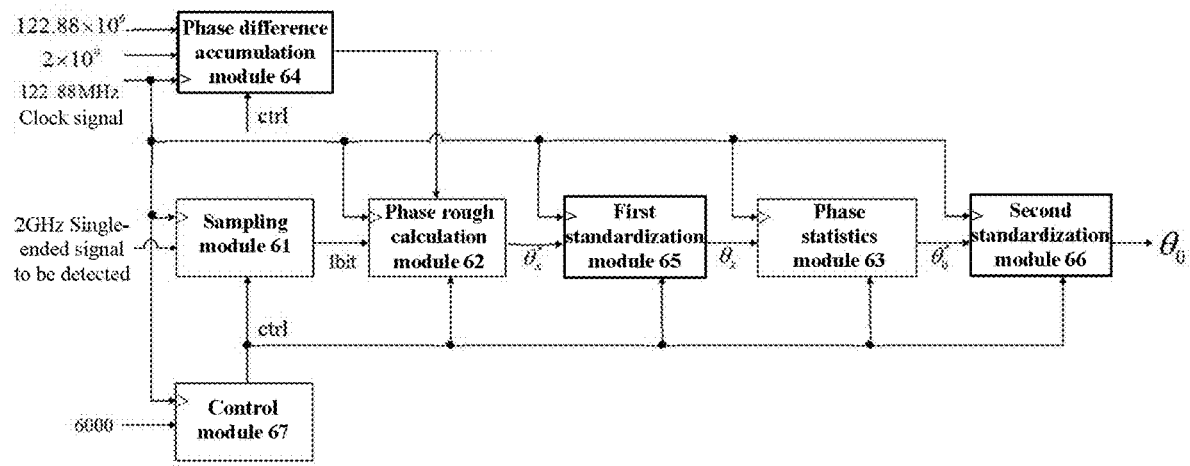
FIG. 16 is a configuration diagram of a phase detection apparatus in a first scenario according to Embodiment 3 of the present disclosure.

The configuration of the phase detection apparatus in this application scenario is shown in FIG. 16. The clock signal of the clock to be detected is a single-ended signal whose frequency is set to 2 GHz, and the clock signal with the frequency of 122.88 MHz (that is, the frequency of the sampling clock is 122.88 MHz) commonly used in the system is used for sampling. $\mathrm{val}_{ref}$ of the phase difference accumulation module 64 is configured as $122.88\times10^6$, and $\mathrm{val}_{sig}$ is $2\times10^9$, then the phase difference between the clock to be detected and the sampling clock in a single sampling period may be calculated as:

$$\varphi_T=99.375°.$$

After k sampling periods, the cumulative phase difference between the clock to be detected and the sampling clock is:

$$\Delta\varphi_K^*=K\times99.375°.$$

In a case where the clock signal of the clock to be detected is a single-ended signal, bin output by the sampling module 61 in each sampling period is 1-bit data, and the angle mapping relationship in the phase rough calculation module 62 is shown in Table 1.

TABLE 1

| bin | $\varphi_x$ | $\theta_x^*$ |
|---|---|---|
| 1 | $\pi/2$ | $\dfrac{\pi}{2}-\Delta\varphi_K$ |
| 0 | $3\pi/2$ | $\dfrac{3\pi}{2}-\Delta\varphi_K$ |

Figure 20:
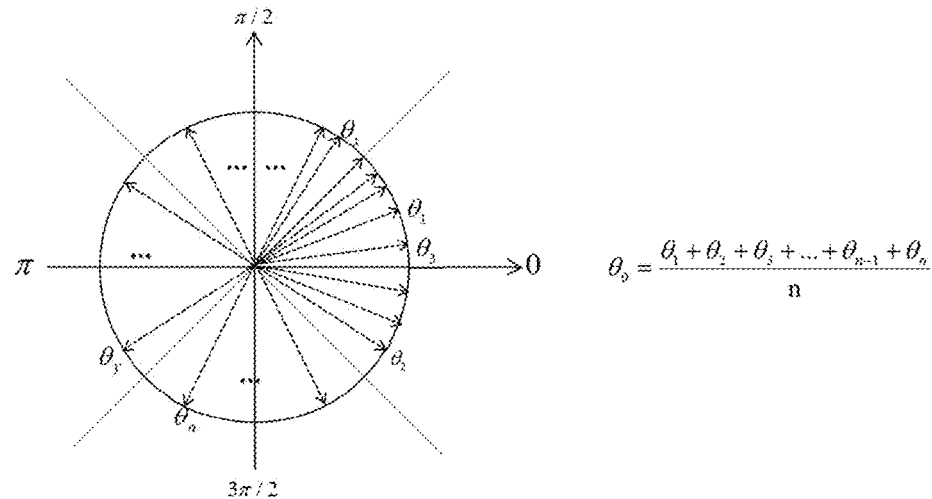
FIG. 20 is a schematic diagram of a statistical average of initial phase values according to Embodiment 3 of the present disclosure.

It is assumed that the phase of the clock to be detected at the initial sampling time is set as 130°, and the number $\mathrm{val}_{sum}$ of sampling periods configured by the control module 67 is 6000. As shown by the statistical average relationship of the initial phase in FIG. 20, after the sampling ends, the initial phase $\theta_0$ of the clock to be detected is converged to 130.19°, and the phase detection error is 0.19°.

Second Application Scenario

Figure 17:
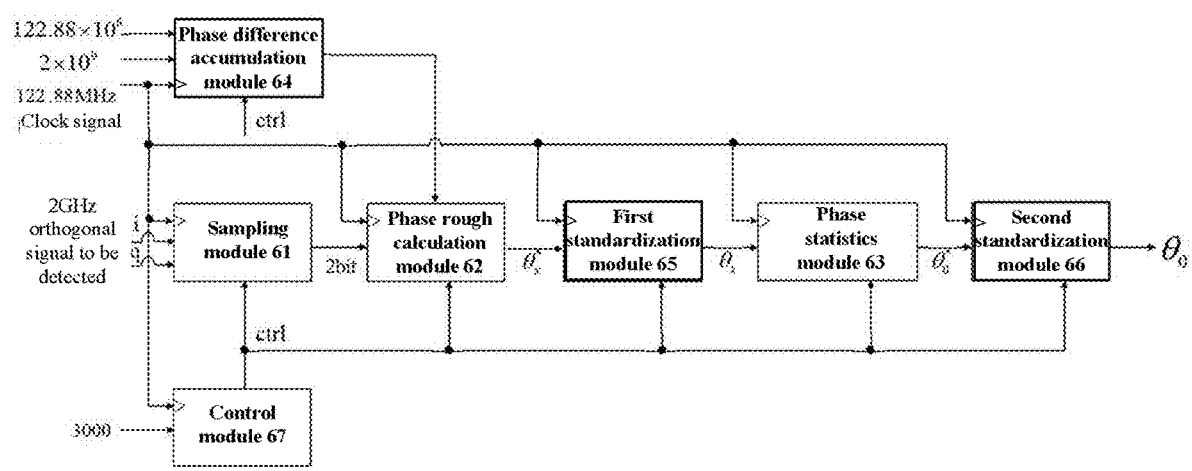
FIG. 17 is a configuration diagram of a phase detection apparatus in a second scenario according to Embodiment 3 of the present disclosure.

The configuration of the phase detection apparatus in this application scenario is shown in FIG. 17. The clock signal of the clock to be detected is an orthogonal signal whose frequency is set to 2 GHz, and the clock signal with the frequency of 122.88 MHz commonly used in the system is used for sampling. $val_{ref}$ of the phase difference accumulation module 64 is configured as $122.88 \times 10^6$, and $val_{sig}$ is $2 \times 10^{9'}$ then the phase difference between the clock to be detected and the sampling clock in a single sampling period may be calculated as:

$\varphi_T = 99.375°$.

After k sampling periods, the cumulative phase difference between the clock to be detected and the sampling clock is:

$\Delta\varphi_K^* = K \times 99.375°$.

In a case where the clock signal of the clock to be detected is an orthogonal signal, bin output by the sampling module 61 in each sampling period is 2-bit data, and the angle mapping relationship in the phase rough calculation module 62 is shown in Table 2.

TABLE 2

| bin_i | bin_q | $\gamma_x$ | $\theta_x^*$ |
|---|---|---|---|
| 1 | 1 | π/4 | $\frac{\pi}{4} - \Delta\varphi_K$ |
| 0 | 1 | 3π/4 | $\frac{3\pi}{4} - \Delta\varphi_K$ |
| 0 | 0 | 5π/4 | $\frac{5\pi}{4} - \Delta\varphi_K$ |
| 1 | 0 | 7π/4 | $\frac{7\pi}{4} - \Delta\varphi_K$ |

It is assumed that the phase of the clock to be detected at the initial sampling time is set as 130°, and the number $val_{sum}$ of sampling periods configured by the control module 67 is 3000. As shown by the statistical average relationship of the initial phase in FIG. 20, after the sampling ends, the initial phase $\theta_0$ of the clock to be detected is converged to 130.19°, and the phase detection error is 0.19°.

Third Application Scenario

Figure 18:
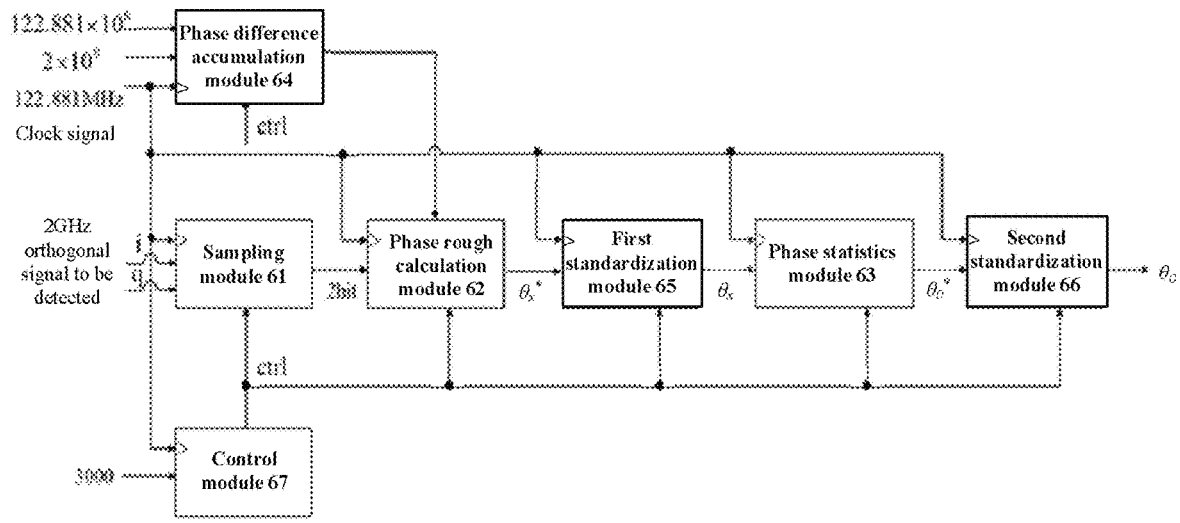
FIG. 18 is a configuration diagram of a phase detection apparatus in a third scenario according to Embodiment 3 of the present disclosure.

This application scenario aims at improving the phase detection accuracy. For the sampling module 61, if the least common multiple of the frequency value of the clock to be detected and the frequency value of the sampling clock is small, that is, there are small integers m and n, such that $m \times val_{sig} = n \times val_{ref}$, then binary data output by the sampling module 61 will enter a periodic cycle after n sampling periods, that is, the maximum sampling diversity will be achieved in n sampling periods. The configuration of the phase detection apparatus in this scenario is shown in FIG. 18. The clock to be detected is an orthogonal signal, whose frequency is set as 2 GHz. In order to improve the phase detection accuracy, the clock signal of 122.881 MHz is used for sampling. $val_{ref}$ of the phase difference accumulation module 64 is configured as $122.881 \times 10^6$, and $val_{sig}$ is configured as $2 \times 10^9$, then the phase difference between the clock signal to be detected and the sampling clock signal in a single sampling period may be calculated as:

$\varphi_T = 99.3273°$.

After k sampling periods, the cumulative phase difference between the clock to be detected and the sampling clock is:

$\Delta\varphi_K^* = K \times 99.3273°$.

In a case where the clock signal of the clock to be detected is an orthogonal signal, bin output by the sampling module 61 in each sampling period is 2-bit data, and the angle mapping relationship in the phase rough calculation module 62 is shown in Table 3.

TABLE 3

| bin_i | bin_q | $\gamma_x$ | $\theta_x^*$ |
|---|---|---|---|
| 1 | 1 | π/4 | $\frac{\pi}{4} - \Delta\varphi_K$ |
| 0 | 1 | 3π/4 | $\frac{3\pi}{4} - \Delta\varphi_K$ |
| 0 | 0 | 5π/4 | $\frac{5\pi}{4} - \Delta\varphi_K$ |
| 1 | 0 | 7π/4 | $\frac{7\pi}{4} - \Delta\varphi_K$ |

It is assumed that the phase of the clock to be detected at the initial sampling time is set as 130°, and the number $val_{sum}$ of sampling periods of the control module 67 is 3000. As shown by the statistical average relationship of the initial phase in FIG. 20, after the sampling ends, the initial phase $\theta_0$ of the clock to be detected is converged to 130.003°, and the phase detection error is 0.003°, which improves the phase detection accuracy.

Fourth Application Scenario

Figure 19:
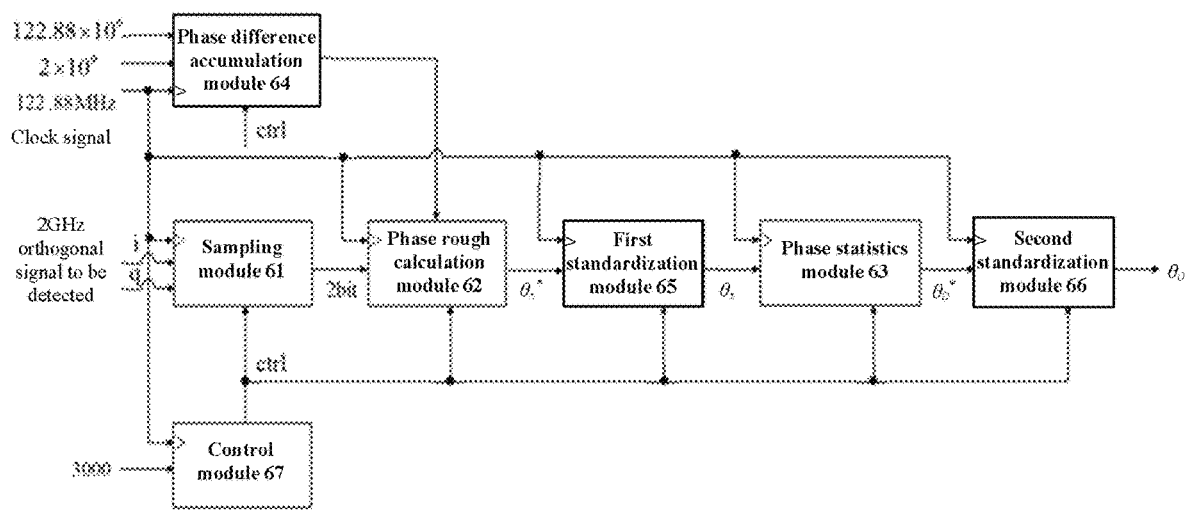
FIG. 19 is a configuration diagram of a phase detection apparatus in a fourth scenario according to Embodiment 3 of the present disclosure.

This application scenario is illustrated by taking fault-tolerance processing for the sampling errors that may occur during sampling near the zero crossing point of the clock to be detected as an example. The configuration of the phase detection apparatus in this scenario is shown in FIG. 19. Specifically, the clock signal of the clock to be detected is an orthogonal signal whose frequency is set as 2 GHz, and the clock signal with the frequency of 122.88 MHz commonly used in the system is used for sampling. $val_{ref}$ of the phase difference accumulation module 64 is configured as $122.88 \times 10^6$, and $val_{sig}$ is configured as $2 \times 10^9$, then the phase difference between the clock to be detected and the sampling clock in a single sampling period may be calculated as:

$\varphi_T = 99.375°$.

After k sampling periods, the cumulative phase difference between the clock to be detected and the sampling clock is:

$\Delta\varphi_K^* = K \times 99.375°$.

In a case where the clock signal of the clock to be detected is an orthogonal signal, bin output by the sampling module 61 in each sampling period is 2-bit data, and the angle mapping relationship in the phase rough calculation module 62 is shown in Table 4.

TABLE 4

| bin_i | bin_q | $\gamma_x$ | $\theta_x^*$ |
|---|---|---|---|
| 1 | 1 | π/4 | $\frac{\pi}{4} - \Delta\varphi_K$ |
| 0 | 1 | 3π/4 | $\frac{3\pi}{4} - \Delta\varphi_K$ |
| 0 | 0 | 5π/4 | $\frac{5\pi}{4} - \Delta\varphi_K$ |
| 1 | 0 | 7π/4 | $\frac{7\pi}{4} - \Delta\varphi_K$ |

Since a self-convergence algorithm in the present embodiment is to calculate the average of a large number of calculated values, the influence of sampling error or calculation error in an intermediate calculation process on the final result can be ignored. However, the first sampling is taken as a determination basis for each subsequent calculation of the phase rough calculation module 62, so if the sampling error at the zero crossing point occurs, the final calculation result of the initial phase will be biased, and the second standardized module 66 will correct such bias.

It is assumed that the phase of the clock to be detected at the initial sampling time is set as 350°, and the number $val_{sum}$ of sampling periods configured by the control module 67 is 3000. The corresponding relationship between the initial phase of convergence and the sampling value is shown in Table 5.

TABLE 5

| bin_i | bin_q | $\theta_0$* | $\theta_0$ standardization |
|---|---|---|---|
| 1 | 0 | 350.18° | 350.18° |
| 1 | 1 | −9.82° | 350.18° |
| 0 | 0 | −9.82° | 350.18° |

After statistical average and the initial phase standardization implemented by the second standardization module 66, after the sampling ends, the initial phase $\theta_0$ of the clock to be detected converges to 350.18°, and the phase detection error is 0.18°.

Embodiment 4

The present embodiment provides a communication device. The communication device may be, but is not limited to, a base station or a variety of transceivers, and includes at least one phase detection apparatus as described in each above embodiment. In an example, when the communication device adopts multi-channel communication, one phase detection apparatus may be used for one channel, or one phase detection apparatus can be shared for multiple channels.

Figure 21:
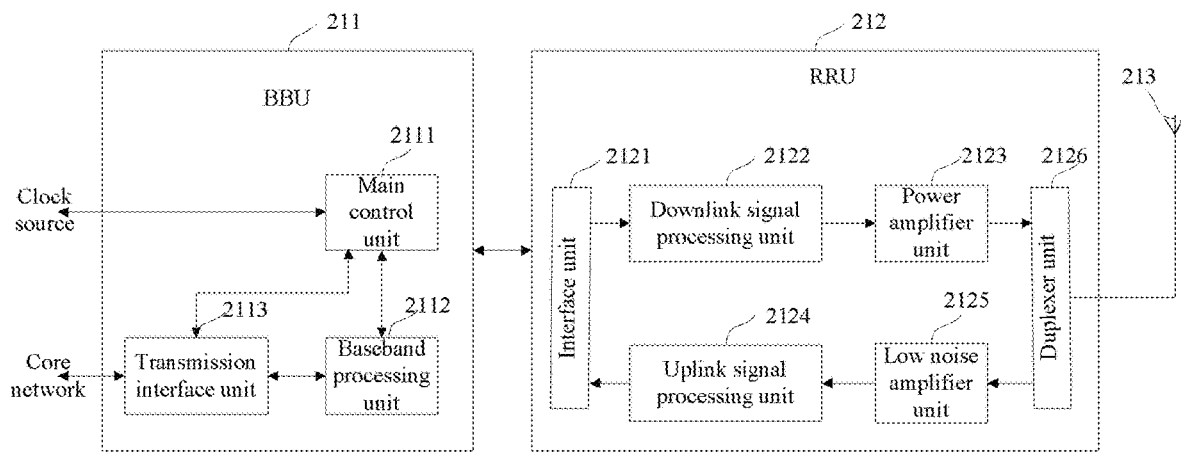
FIG. 21 is a structural schematic diagram of a base station according to Embodiment 4 of the present disclosure.

For ease of understanding, in an example of the present embodiment, the communication device is a base station. It should be understood that the base station in the present embodiment may be a cabinet macro base station, a distributed base station or a multi-mode base station. As shown in FIG. 21, the base station in the present embodiment may include a Building Base Band Unit (BBU) 211, a Radio Remote Unit (RRU) 212 and an antenna 213.

The BBU 211 is responsible for centralized control and management of the whole base station system, completing an uplink and downlink baseband processing function, and providing a physical interface with a radio unit and a transmission network to complete information interaction. According to different logical functions, as shown in FIG. 21, the BBU 211 may include a baseband processing unit 2112, a main control unit 2111, a transmission interface unit 2113, etc. The main control unit 2111 mainly implements the control and management over the BBU 211, signaling processing, data transmission, interactive control, system clock supply and other functions. The baseband processing unit 2112 is configured to complete baseband protocol processing like signal coding modulation, resource scheduling, and data encapsulation, and provide an interface between the BBU 211 and the RRU 212. The transmission interface unit 2113 is responsible for providing a transmission interface connected a core network. In the example, the logical function units may be distributed on different physical boards or integrated on the same board. As an exemplary implementation, the BBU 211 may adopt a mode of integrated baseband and main control or a mode of separate baseband and main control. For the mode of integrated baseband and main control, main control, transmission and baseband are integrated, that is, the baseband processing unit, the main control unit and the transmission interface unit are integrated on a physical board. This architecture has higher reliability, lower delay, higher resource sharing and scheduling efficiency, and lower power consumption. For the mode of separate baseband and main control, the baseband processing unit and the main control unit are distributed on different boards, corresponding to a baseband board and a main control board. The separate architecture supports free combination between the boards, and facilitates flexible baseband expansion. The mode may be adopted flexibly according to requirements.

The RRU 212 communicates with the BBU 211 through a baseband radio frequency interface to complete the conversion between a baseband signal and a radio frequency signal. As shown in FIG. 21, the RRU 212 of an example may mainly include an interface unit 2121, an uplink signal processing unit 2124, a downlink signal processing unit 2122, a power amplifier unit 2123, a low noise amplifier unit 2125, a duplexer unit 2126, etc., which form a downlink signal processing link and an uplink signal processing link. The interface unit 2121 provides a feedforward interface between the BBU 211 and the RRU 212 to receive and send a baseband IQ signal. The downlink signal processing unit 2122 completes signal up-conversion, digital-to-analog conversion, radio frequency modulation and other signal processing functions. The uplink signal processing unit 2124 mainly completes signal filtering, frequency mixing, digital-to-analog conversion, down-conversion and other functions. The power amplifier unit 2123 is configured to amplify a downlink signal and send the amplified downlink signal through the antenna 213. The low noise amplifier unit 2125 is configured to amplify the uplink signal received by the antenna 213 and send the amplified uplink signal to the uplink signal processing unit 2124 for processing. The duplexer unit 2126 supports multiplexing and filtering of received and sent signals.

In addition, it should be understood that the base station in the present embodiment may also adopt a Central Unit (CU)-Distributed Unit (DU) architecture. The DU is a distributed access point, which is responsible for completing a lower-layer baseband protocol and radio frequency processing function. The CU is a central unit, which is responsible for processing a high-layer protocol and centrally managing multiple DUs. The CU and the DU jointly complete the baseband and radio frequency processing function of the base station.

It can be seen that those having ordinary skill in the art should understand that all or some of the operations in the above method disclosed, the system, the functional modules/units in the apparatus may be implemented as software (which may be implemented by computer program codes executable for a computing apparatus), firmware, hardware and a proper combination of them. In an implementation of hardware, the division among the functional modules/units mentioned in the above description does not necessarily correspond to the division of physical units; for example, a physical component may have multiple functions, or a function or operation may be performed by several physical components in coordination. Some or all of the physical components may be implemented as software performed by a processor, for example, a central processing unit, a digital signal processor or a microprocessor, or implemented as hardware, or implemented as an integrated circuit, for example, an application-specific integrated circuit. Moreover, as those of ordinary skill in the art know, the communication media generally include the computer readable instruction, the data structure, the computer program module or other data, such as carriers or other transmission mechanisms, in a modulation data signal, and may include any information delivery media. Therefore, the present disclosure is not limited to any particular combination of hardware and software.

The above contents are further elaborations of the embodiments of the present disclosure made with reference to the exemplary embodiments, but it should not be considered that the exemplary implementation of the present disclosure is limited to these elaborations. On the premise of not departing from the conception of the present disclosure, those ordinary skill in the art to which the present disclosure belongs may also make some simple deductions and replacements, which should fall within the scope of protection of the present disclosure.

What is claimed is:

1. A phase detection method for a clock signal, comprising:
    sampling, according to sampling periods set by a sampling clock, a clock signal of a clock to be detected;
    obtaining, according to a mapping relationship between sampled signals and phase angle values, a phase angle value corresponding to a sampled clock signal in a current sampling period;
    subtracting a phase difference corresponding to the current sampling period from the phase angle value to obtain an initial phase value of the clock to be detected in the current sampling period, wherein the phase difference is a phase difference between the clock to be detected and the sampling clock in the current sampling period; and
    after the sampling ends, obtaining a final phase value of the clock to be detected according to initial phase values obtained in respective sampling periods.

2. The phase detection method for a clock signal according to claim 1, wherein the mapping relationship between the sampled signals and the phase angle values comprises: the mapping relationship between digital pulse signal sequences and the phase angle values;
    obtaining a phase angle value corresponding to a sampled clock signal in a current sampling period comprises:
    converting the sampled clock signal into a digital pulse signal sequence; and
    determining the phase angle value corresponding to the obtained digital pulse signal sequence according to the mapping relationship between the digital pulse signal sequences and the phase angle values.

3. The phase detection method according to claim 1, wherein the phase difference between the clock to be detected and the sampling clock in the current sampling period is a value obtained by multiplying the phase difference between the clock to be detected and the sampling clock by a current number of sampling periods to obtain a product, and then taking a remainder of the product divided by $2\pi$.

4. The phase detection method for a clock signal according to claim 1, wherein after subtracting a phase difference corresponding to the current sampling period from the phase angle value to obtain an initial phase value of the clock to be detected in the current sampling period, and before obtaining a final phase value of the clock to be detected according to initial phase values obtained in respective sampling periods, the method further comprises a first standardization process comprising:
    in a case where the initial phase value obtained in the current sampling period is greater than an initial phase value obtained in a first sampling period plus $\pi$, subtracting $2\pi$ from the initial phase value obtained in the current sampling period; and
    in a case where the initial phase value obtained in the current sampling period is less than the initial phase value obtained in the first sampling period minus $\pi$, adding $2\pi$ to the initial phase value obtained in the current sampling period.

5. The phase detection method for a clock signal according to claim 1, wherein after obtaining a final phase value of the clock to be detected, the method further comprises a second standardization process comprising:
    in a case where the final phase value is less than 0, adding $2\pi$ to the final phase value.

6. The phase detection method for a clock signal according to claim 1, wherein the clock signal of the clock to be detected is any of following signal types:
    single-ended signal, differential signal, or orthogonal signal.

7. The phase detection method for a clock signal according to claim 6, wherein in a case where the clock signal of the clock to be detected is a single-ended signal, obtaining a final phase value of the clock to be detected according to initial phase values obtained in respective sampling periods comprises:
    selecting a minimum initial phase value from the initial phase values obtained in the respective sampling periods as the final phase value of the clock to be detected.

8. The phase detection method for a clock signal according to claim 6, wherein in a case where the clock signal of the clock to be detected is a differential signal or an orthogonal signal, obtaining a final phase value of the clock to be detected according to initial phase values obtained in respective sampling periods comprises:
    determining an average value of the initial phase values obtained in the respective sampling periods as the final phase value of the clock to be detected.

9. The phase detection method for a clock signal according to claim 1, further comprising:
    after obtaining the final phase value, in a case of determining, according to the final phase value, that a detected phase error is greater than a preset error threshold, updating to use a sampling clock with a frequency greater than a frequency of the current sampling clock for sampling, so as to increase a minimum common multiple of the frequency of the sampling clock and a frequency of the clock to be detected.

10. A phase detection apparatus for a clock signal, comprising:
    a sampling module, configured to sample, according to sampling periods set by a sampling clock, a clock signal of a clock to be detected;
    a phase rough calculation module, configured to obtain, according to a mapping relationship between sampled signals and phase angle values, a phase angle value corresponding to a sampled clock signal in a current sampling period, and subtract a phase difference corresponding to the current sampling period from the phase angle value to obtain an initial phase value of the clock to be detected in the current sampling period, wherein the phase difference is a phase difference between the clock to be detected and the sampling clock in the current sampling period; and
    a phase statistics module, configured to obtain, after the sampling ends, a final phase value of the clock to be detected according to initial phase values obtained in respective sampling periods.

11. The phase detection apparatus for a clock signal according to claim 10, wherein the sampling module comprises a sampler and a waveform shaper;

the sampler is configured to sample the clock signal of the clock to be detected according to the sampling periods set by the sampling clock; and the waveform shaper is configured to perform waveform shaping on the sampled clock signal sampled by the sampler and output a digital pulse signal sequence.

12. The phase detection apparatus for a clock signal according to claim 11, wherein the mapping relationship between the sampled signals and the phase angle values comprises: the mapping relationship between digital pulse signal sequences and the phase angle values;

the phase rough calculation module comprises an angle mapper and a subtracter;

the angle mapper is configured to determine the phase angle value corresponding to the digital pulse signal sequence output by the sampling module according to the mapping relationship between the digital pulse signal sequences and the phase angle values; and the subtracter is configured to subtract the phase difference corresponding to the current sampling period from the phase angle value to obtain the initial phase value of the clock to be detected in the current sampling period.

13. The phase detection apparatus for a clock signal according to claim 12, further comprising: a phase difference accumulation module, configured to send an accumulated phase difference obtained by multiplying the phase difference between the clock to be detected and the sampling clock by a current number of sampling periods to the phase rough calculation module;

the phase rough calculation module further comprises a standardizer, configured to divide the accumulated phase difference by $2\pi$ and take a remainder of the accumulated phase difference divided by $2\pi$ as the phase difference corresponding to the current sampling period.

14. The phase detection apparatus for a clock signal according to claim 10, further comprising a first standardization module, configured to, in a case where the initial phase value of the clock to be detected in the current sampling period obtained by the phase rough calculation module is greater than an initial phase value obtained in a first sampling period plus $\pi$, subtract $2\pi$ from the initial phase value obtained in the current sampling period and send the difference to the phase statistics module; and in a case where the initial phase value of the clock to be detected in the current sampling period obtained by the phase rough calculation module is less than the initial phase value obtained in the first sampling period minus $\pi$, add $2\pi$ to the initial phase value obtained in the current sampling period and send the sum to the phase statistics module.

15. The phase detection apparatus for a clock signal according to claim 10, further comprising: a second standardization module, configured to add $2\pi$ to the final phase value in a case where the final phase value obtained by the phase statistics module is less than 0.

16. The phase detection apparatus for a clock signal according to claim 10, further comprising: a control module, configured to, in a case of determining, according to the final phase value, that a detected phase error is greater than a preset error threshold, update to use a sampling clock with a frequency greater than a frequency of the current sampling clock for sampling, so as to increase a minimum common multiple of the frequency of the sampling clock and a frequency of the clock to be detected.

17. A communication device, comprising at least one phase detection apparatus for a clock signal according to claim 10.

18. The phase detection apparatus for a clock signal according to claim 10, wherein the clock signal of the clock to be detected is any of following signal types:

single-ended signal, differential signal, or orthogonal signal.

19. The phase detection apparatus for a clock signal according to claim 18, wherein in a case where the clock signal of the clock to be detected is a single-ended signal, the phase statistics module is configured to select a minimum initial phase value from the initial phase values obtained in the respective sampling periods as the final phase value of the clock to be detected.

20. The phase detection apparatus for a clock signal according to claim 18, wherein in a case where the clock signal of the clock to be detected is a differential signal or an orthogonal signal, the phase statistics module is configured to determine an average value of the initial phase values obtained in the respective sampling periods as the final phase value of the clock to be detected.

* * * * *